(12) United States Patent
Landemaine et al.

(10) Patent No.: US 11,599,189 B2
(45) Date of Patent: Mar. 7, 2023

(54) HEAD ORIENTATION TRACKING

(71) Applicant: Bose Corporation, Framingham, MA (US)

(72) Inventors: Thomas Claude Bernard Landemaine, Cambridge, MA (US); Andrew Farrell, Boston, MA (US)

(73) Assignee: Bose Corporation, Framingham, MA (US)

( * ) Notice: Subject to any disclaimer, the term of this patent is extended or adjusted under 35 U.S.C. 154(b) by 365 days.

(21) Appl. No.: 16/904,889

(22) Filed: Jun. 18, 2020

(65) Prior Publication Data

US 2021/0397248 A1 Dec. 23, 2021

(51) Int. Cl.
*G06T 7/55* (2017.01)
*G06F 3/01* (2006.01)
*H04S 7/00* (2006.01)

(52) U.S. Cl.
CPC ............... *G06F 3/012* (2013.01); *G06T 7/55* (2017.01); *H04S 7/304* (2013.01); *G06T 2207/10028* (2013.01); *G06T 2207/30196* (2013.01)

(58) Field of Classification Search
CPC . G06F 3/012; G06T 7/55; G06T 2207/10028; G06T 2207/30196; H04S 7/304; H04R 2499/13; H04R 1/1041
See application file for complete search history.

(56) References Cited

U.S. PATENT DOCUMENTS

| | | | |
|---|---|---|---|
| 2013/0279724 A1* | 10/2013 | Stafford | H04R 1/1041 381/74 |
| 2016/0299569 A1* | 10/2016 | Fisher | H04N 5/23238 |
| 2017/0102467 A1* | 4/2017 | Nielsen | G01S 19/47 |
| 2019/0057612 A1* | 2/2019 | Schupp | G06F 3/013 |
| 2019/0268712 A1* | 8/2019 | Martin | H04R 1/1041 |
| 2020/0310460 A1* | 10/2020 | Sarkar | G06V 20/56 |

* cited by examiner

*Primary Examiner* — Jitesh Patel
(74) *Attorney, Agent, or Firm* — Hoffman Warnick LLC (57) ABSTRACT

Various implementations include devices, systems and approaches for tracking user orientation. In some cases, a wearable audio device includes: an electro-acoustic transducer for providing an audio output; an inertial measurement unit (IMU) for indicating motion of the wearable audio device; a set of distance sensors; and a controller coupled with the electro-acoustic transducer, the IMU and the set of distance sensors, the controller configured to: determine an orientation of a user of the wearable audio device based on the indication of motion from the IMU; verify the orientation of the user as detected by the IMU, using data from the set of distance sensors; and execute an orientation-based action in response to verifying the orientation of the user.

20 Claims, 5 Drawing Sheets

HEAD ORIENTATION TRACKING

TECHNICAL FIELD

This disclosure generally relates to controlling device functions using determined orientation, e.g., of a user. More particularly, the disclosure relates to wearable audio devices, systems and related methods for controlling device functions using determined orientation.

BACKGROUND

Detecting user orientation from wearable devices such as wearable audio devices can be challenging. For example, microelectromechanical systems such as inertial measurement units (IMUs) and/or magnetometers are prone to measurement error due to the integrating nature of their measurements, which can cause drift from the original reference point of measurement (also called "bias drift"). This bias drift can make orientation-based control of such devices challenging.

SUMMARY

All examples and features mentioned below can be combined in any technically possible way.

Various implementations include devices and systems for tracking user orientation. Certain implementations include controlling orientation-based actions in response to verifying a user orientation, such as a user head orientation.

In some particular aspects, a wearable audio device includes: an electro-acoustic transducer for providing an audio output; an inertial measurement unit (IMU) for indicating motion of the wearable audio device; a set of distance sensors; and a controller coupled with the electro-acoustic transducer, the IMU and the set of distance sensors, the controller configured to: determine an orientation of a user of the wearable audio device based on the indication of motion from the IMU; verify the orientation of the user as detected by the IMU, using data from the set of distance sensors; and execute an orientation-based action in response to verifying the orientation of the user In other particular aspects, a system includes: a wearable audio device, having: an electro-acoustic transducer for providing an audio output; an inertial measurement unit (IMU) for indicating motion of the wearable audio device; and a controller coupled with the electro-acoustic transducer and the IMU; and a set of distance sensors in communication with the controller, where the controller is configured to: determine an orientation of a user of the wearable audio device based on the indication of motion from the IMU; verify the orientation of the user as detected by the IMU, using data from the set of distance sensors; and execute an orientation-based action at the wearable audio device in response to verifying the orientation of the user.

In additional particular aspects, a computer-implemented method of controlling a wearable audio device includes: verifying an orientation of a user of the wearable audio device as determined from motion detected by an inertial measurement unit (IMU) located at the wearable audio device, where the verifying includes comparing data about the determined orientation of the user against data from a set of distance sensors; and executing an orientation-based action at the wearable audio device in response to verifying the orientation of the user.

Implementations may include one of the following features, or any combination thereof.

In some cases, the set of distance sensors include at least two distinct sensors.

In certain aspects, the set of distance sensors include a set of at least one of: an infra-red (IR) sensor, a vision sensor, an ultrasonic sensor a three-dimensional (3D) depth camera, a stereo camera system or a time-of-flight system.

In particular implementations, the wearable audio device includes a frame for mounting on a head of the user.

In some aspects, when worn on the head of the user, the set of distance sensors are directed at least partially downward relative to the head of the user to detect a relative position of each distance sensor to at least one of a floor surface or portion of a body of the user.

In particular cases, the set of distance sensors includes a first subset of distance sensors on a left side of the frame and a second subset of distance sensors on a right side of the frame, where each subset comprises a vision sensor paired with an infra-red (IR) sensor.

In certain implementations, the vision sensor includes a camera, and the controller is configured to verify the orientation of the user by correlating depth data from the IR sensor with image data from the camera.

In some aspects, the wearable audio device includes an aviation headset, and the orientation-based action includes providing a warning to adjust a focus of the user.

In particular cases, the wearable audio device includes a head-mounted wearable audio device including one of: headphones, earphones, or audio eyeglasses.

In certain implementations, the controller is configured to switch between an active mode and an idle mode based on whether orientation tracking is enabled at the wearable audio device.

In some aspects, during the active mode, data from the set of distance sensors is obtained either on a periodic basis or in response to data from the IMU indicating movement by the user.

In particular implementations, orientation tracking is enabled or disabled by a software application running at the wearable audio device or a connected device.

In certain aspects, the controller is configured to send data about the verified orientation to a position tracking system for lowering an error rate in at least one position tracking equation that calculates a position of the wearable audio device.

In some cases, the position tracking system executes at the wearable audio device or a connected device.

In particular aspects, verifying the orientation of the user corrects for drift in the indicated motion from the IMU and includes: receiving motion data from the IMU indicating that the user is in a first orientation; receiving the data from the distance sensors, where the data from the distance sensors comprises two sets of distance data each indicating a relative position of a distinct section of the wearable audio device to a reference position; and verifying that the user is in the first orientation in response to the motion data from the IMU and the data from the distance sensors corresponding to the first orientation.

In certain cases, the controller is further configured to: refuse to verify that the user is in the first orientation in response to the data from the distance sensors corresponding to a second, distinct orientation.

Two or more features described in this disclosure, including those described in this summary section, may be combined to form implementations not specifically described herein.

The details of one or more implementations are set forth in the accompanying drawings and the description below.

Other features, objects and advantages will be apparent from the description and drawings, and from the claims.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a multi-sensor system can be used to verify user orientation and execute an orientation-based action. In certain implementations, a device includes an inertial measurement unit (IMU) or another microelectromechanical system (MEMS) for indicating user motion, and a set of distance sensors for verifying user orientation as determined with motion data from the IMU. In some cases, the device is configured to execute an orientation-based action in response to verifying the orientation of the user.

Various aspects of controlling audio functions are described in U.S. Pat. No. 10,194,259 ("Directional Audio Selection"), U.S. patent application Ser. No. 16/570,238 ("Spatialized Augmented Reality (AR) Audio Menu," filed on Sep. 13, 2019), U.S. patent application Ser. No. 16/511,375 ("Multi-Application Control of Augmented Reality Audio," filed on Jul. 15, 2019), U.S. patent application Ser. No. 16/179,205 ("Spatialized Virtual Personal Assistant", filed on Nov. 2, 2018), U.S. patent application Ser. No. 16/267,643 ("Location-Based Personal Audio"), U.S. patent application Ser. No. 16/289,932 ("Augmented Audio Development"), and U.S. patent application Ser. No. 16/289,940 ("Augmented Reality Audio Playback Control"), each of which is incorporated by reference in its entirety.

Commonly labeled components in the FIGURES are considered to be substantially equivalent components for the purposes of illustration, and redundant discussion of those components is omitted for clarity.

Aspects and implementations disclosed herein may be applicable to a wide variety of audio devices including personal audio devices, such as a portable speaker, headphones, and wearable audio devices in various form factors, such as watches, glasses, neck-worn speakers, helmets with integrated speakers, shoulder-worn speakers, body-worn speakers, etc. Wearable audio devices are disclosed in various form factors, such as head-worn devices (e.g., headsets, headphones, earphones, eyeglasses, helmets, hats, visors), neck-worn speakers, shoulder-worn speakers, body-worn speakers (e.g., watches), etc. Some particular aspects disclosed may be applicable to personal (wearable) audio devices such as head-mounted audio devices, including headphones, earphones, helmets, hats, visors, eyeglasses, etc. It should be noted that although specific implementations of audio devices primarily serving the purpose of acoustically outputting audio are presented with some degree of detail, such presentations of specific implementations are intended to facilitate understanding through provision of examples and should not be taken as limiting either the scope of disclosure or the scope of claim coverage.

The wearable audio devices disclosed herein can include additional features and capabilities not explicitly described. These wearable audio devices can include additional hardware components, such as one or more cameras, location tracking devices, microphones, etc., and may be capable of voice recognition, visual recognition, and other smart device functions. The description of wearable audio devices included herein is not intended to exclude these additional capabilities in such a device.

Figure 1:
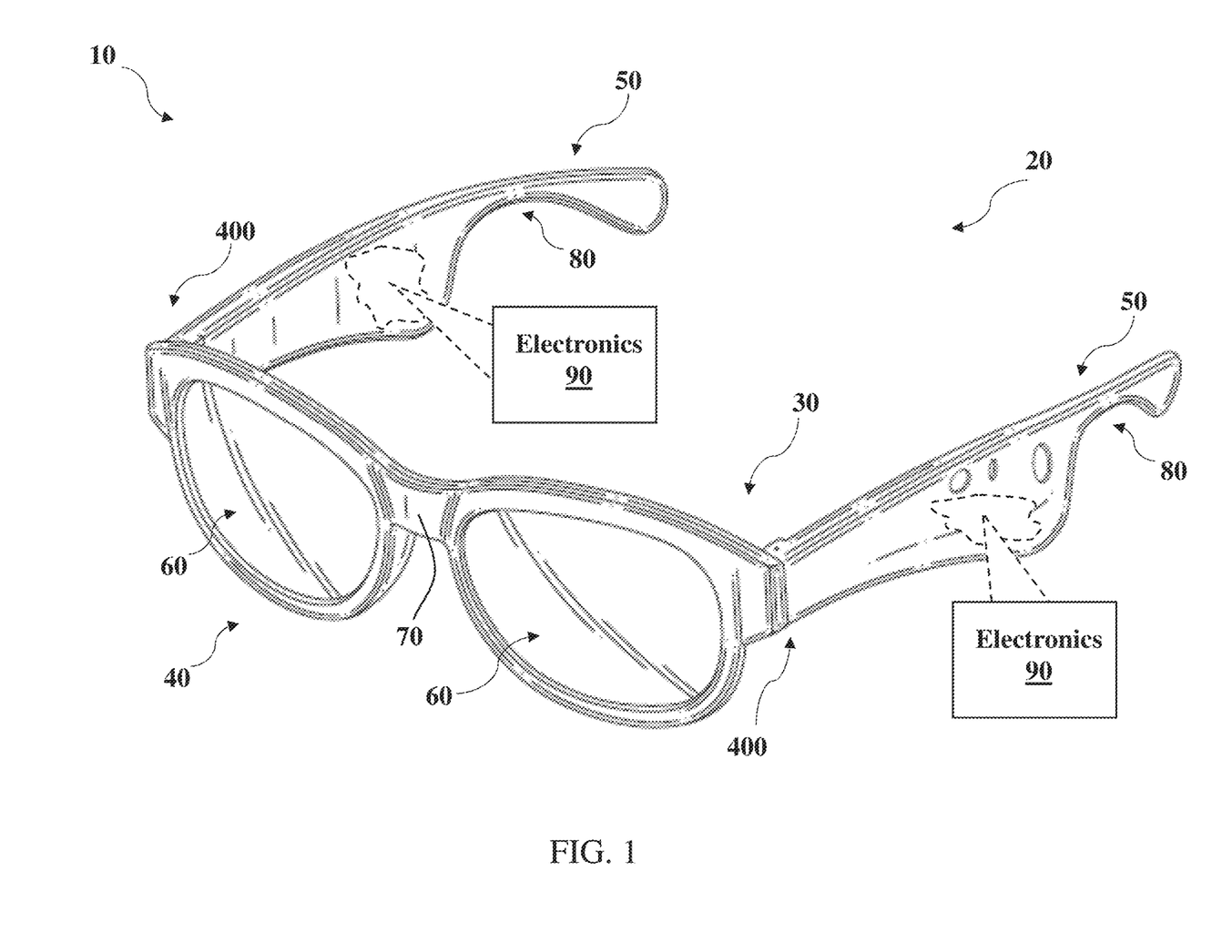
FIG. 1 is a schematic depiction of an example audio device according to various implementations.

FIG. 1 is a schematic depiction of a wearable audio device 10 according to various implementations. In this example implementation, the wearable audio device 10 is a pair of audio eyeglasses 20. As shown, the wearable audio device 10 can include a frame 30 having a first section (e.g., lens section) 40 and at least one additional section (e.g., arm sections) 50 extending from the first section 40. In this example, as with conventional eyeglasses, the first (or, lens) section 40 and additional section(s) (arms) 50 are designed for resting on the head of a user. In this example, the lens section 40 can include a set of lenses 60, which can include prescription, non-prescription and/or light-filtering lenses, as well as a bridge 70 (which may include padding) for resting on the user's nose. Arms 50 can include a contour 80 for resting on the user's respective ears.

Contained within the frame 30 (or substantially contained, such that a component can extend beyond the boundary of the frame) are electronics 90 and other components for controlling the wearable audio device 10 according to particular implementations. In some cases, separate, or duplicate sets of electronics 90 are contained in portions of the frame, e.g., each of the respective arms 50 in the frame 30. However, certain components described herein can also be present in singular form.

Figure 2:
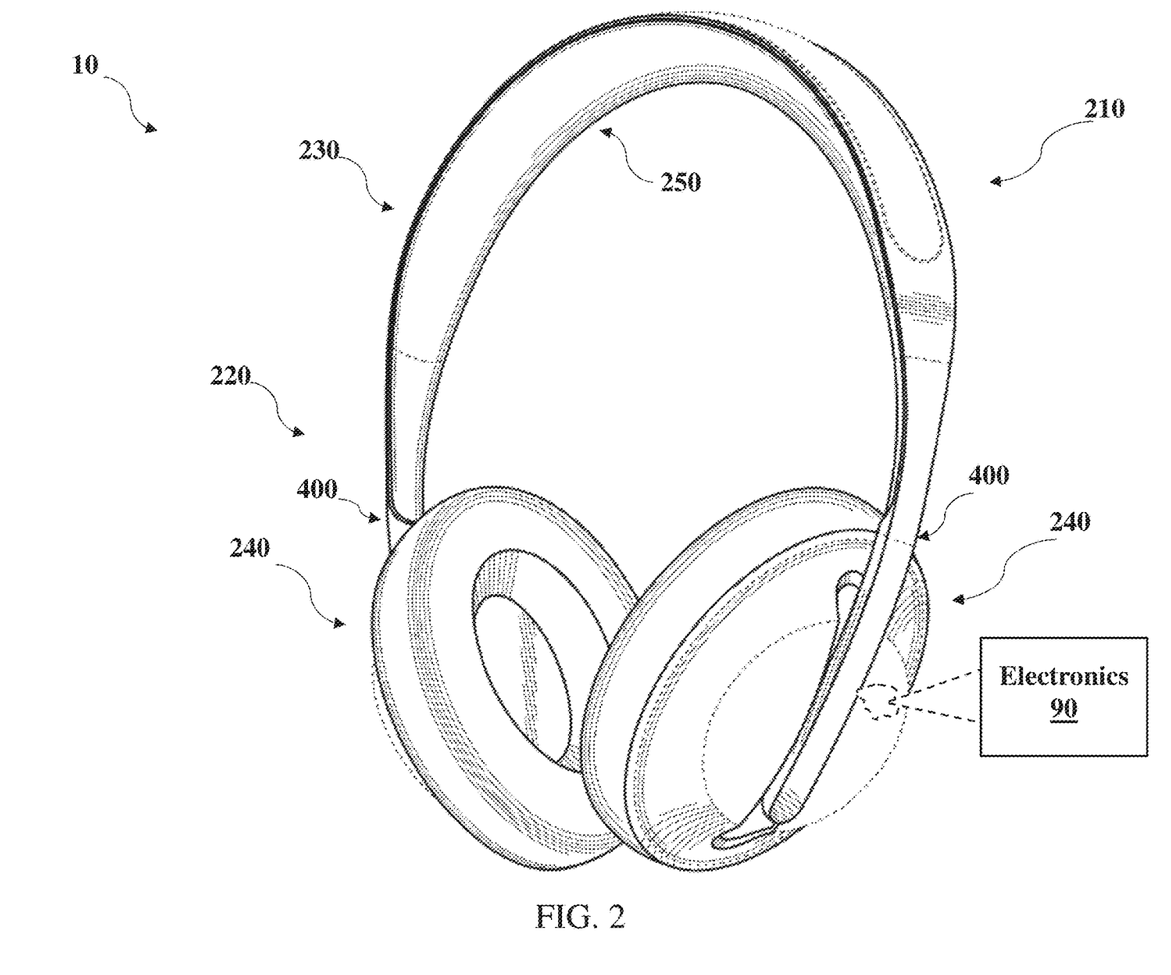
FIG. 2 is a schematic depiction of an additional example audio device according to various implementations.

FIG. 2 depicts another example wearable audio device 10 in the form of headphones 210. In some cases, the headphones 210 include on-ear or around-ear headphones 210. The headphones 210 can include a frame 220 with a first section (e.g., headband) 230 and at least one additional section (e.g., earcup(s)) 240 extending from the first section 230. In various implementations, the headband 230 includes a head cushion 250. Stored within one or both of the earcups 240 are electronics 90 and other components for controlling the wearable audio device 10 according to particular implementations. It is understood that headphones 210 depicted in FIG. 2 are merely one example form factor, and that in-ear headphones (also referred to as earphones or earbuds) helmets, visors, etc. can include electronics 90 capable of performing functions described herein.

Figure 3:
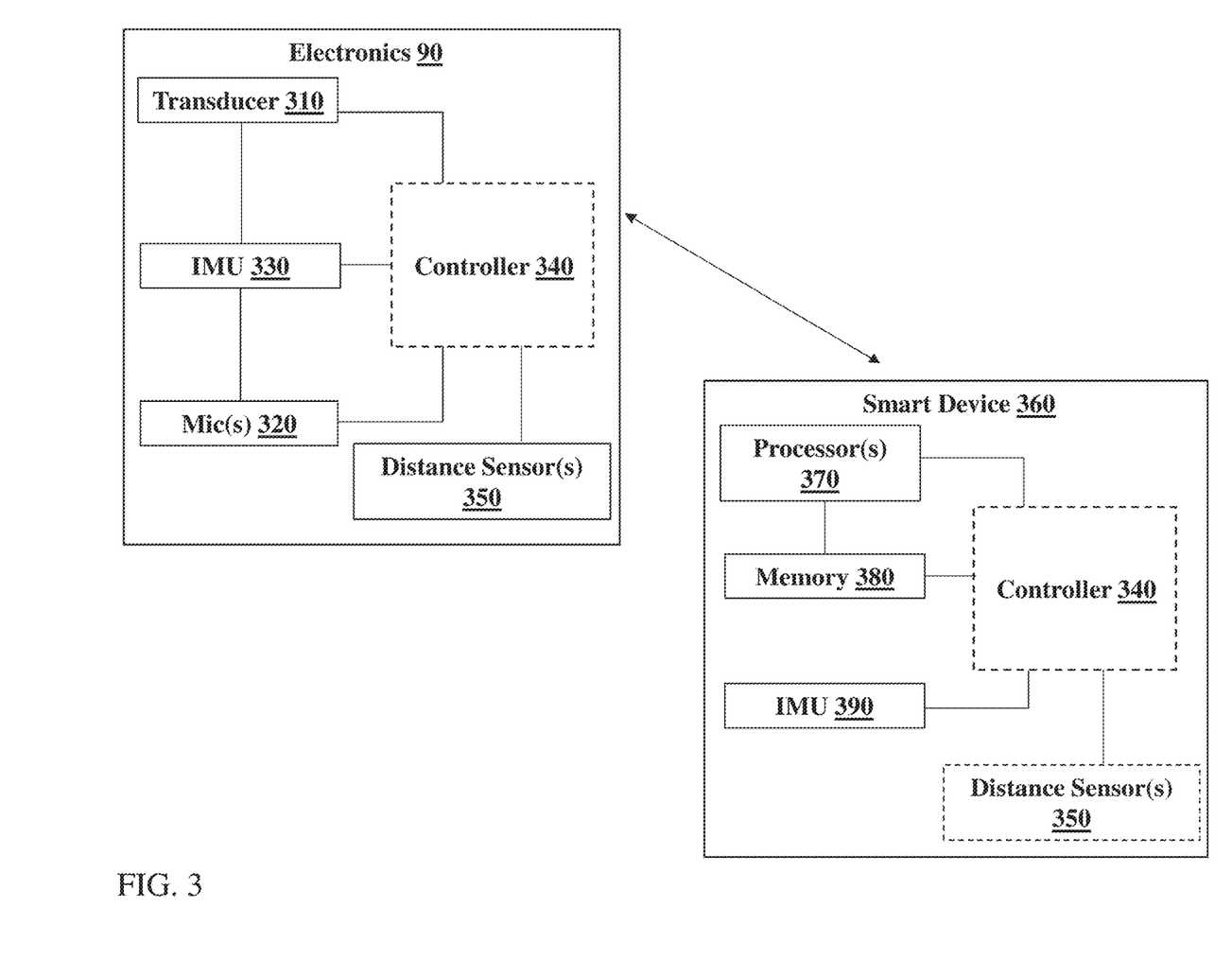
FIG. 3 is data flow diagram illustrating interaction between an audio device and a smart device according to various implementations.

FIG. 3 shows a schematic depiction of the electronics 90 contained within the frame 30 (FIG. 1) and/or the frame 220 (FIG. 2). It is understood that one or more of the components in electronics 90 may be implemented as hardware and/or software, and that such components may be connected by any conventional means (e.g., hard-wired and/or wireless connection). It is further understood that any component described as connected or coupled to another component in the wearable audio device 10 or other systems disclosed according to implementations may communicate using any conventional hard-wired connection and/or additional communications protocols. In various particular implementations, separately housed components in wearable audio device 10 are configured to communicate using one or more conventional wireless transceivers.

As shown in FIG. 3, electronics 90 at least partially contained within the frame 30 (FIG. 1) or frame 210 (FIG. 2) can include a transducer 310 (e.g., electro-acoustic transducer), at least one microphone (e.g., a single microphone or an array of microphones) 320, and an inertial measurement unit (IMU) 330. Each of the transducer 310, microphone(s) 320 and IMU 330 are connected with a controller 340, which is configured to perform control functions according to various implementations described herein. Controller 340 can be coupled with other components in the electronics 90 via any conventional wireless and/or hardwired connection which allows controller 340 to send/receive signals to/from those components and control operation thereof. In additional implementations, the electronics 90 can include a set of distance sensors 350 coupled with the controller 340.

In some cases, the IMU 330 is configured to detect user movement, including movement of a user's head or other body part(s), and/or the look direction of a user. In particular, portions of the IMU 330 may incorporate one or more movement sensors, such as accelerometers, gyroscopes and/or magnetometers. In some cases, the IMU 330 includes one or more IMUs having three-dimensional (3D) accelerometers, gyroscopes and a magnetometer. The distance sensor(s) 350 are configured, in some implementations, to verify the orientation of a user of the audio device 10 as indicated by motion measured by the IMU 330. In particular cases, the set of distance sensors 350 includes two or more sensors, e.g., one on each side of the audio device 10, such as one located proximate each arm 50 of the audio eyeglasses (FIG. 1) or each earcup 240 of a set of headphones (FIG. 2). In certain cases, as noted herein, the distance sensor(s) 350 include at least one of: an infra-red (IR) sensor, a vision sensor, an ultrasonic sensor, a three-dimensional (3D) depth camera, a stereo camera system or a time-of-flight system.

As described herein, the electronics 90 (e.g., IMU 330 and distance sensor(s) 350) are configured to detect and verify a position, or a change in position, of the audio device 10. In some cases, the electronics 90 are configured to detect a user gesture, such as certain changes in orientation. This orientation information can be used to control various functions described herein. For example, the orientation information can be used to trigger a command function, such as activating an operating mode of the audio device 10 (e.g., AR audio mode), modifying playback of an audio file, or adjusting a setting on the audio device 10, etc. The electronics 90 can also include one or more interface(s) for receiving commands at the audio device 10, e.g., permitting a user to initiate functions of the audio device 10. In a particular example implementation, the electronics 90 can include, or be coupled with, a capacitive touch interface for receiving tactile commands on the audio device 10.

Electronics 90 can include other components not specifically depicted herein, such as one or more power sources, memory and/or processors, motion/movement detection components (e.g., an inertial measurement unit, gyroscope/magnetometer, etc.), communications components (e.g., a wireless transceiver (WT)) configured to communicate with one or more other electronic devices connected via one or more wireless networks (e.g., a local WiFi network, Bluetooth connection, or radio frequency (RF) connection), and amplification and signal processing components. It is understood that these components or functional equivalents of these components can be connected with, or form part of, the controller 340. Various additional functions of the electronics 90 are described in U.S. Pat. No. 10,353,221, incorporated by reference herein in its entirety In some implementations, one or more components in the electronics 90, or functions performed by such components, are located or performed on a smart device 360, such as a smart phone, smart watch, tablet, laptop computer or other computing device. In various implementations, one or more functions of the controller 340 can be executed using one or more control circuits and/or chips at the smart device 360. In particular cases, actions of the controller 340 are executed as software functions via one or more controllers 340. In some cases, the smart device 360 includes an interface for interacting with controller 340, however, in other cases, both the wearable audio device 10 and the smart device 360 have separate interfaces. In certain cases, the smart device 360 includes at least one processor 370 (e.g., one or more processors, which can include digital signal processor(s)) and memory 380. In some cases, the smart device 360 also includes an additional distance sensor 350 and/or IMU 390 with one or more similar components as described with respect to the electronics 90. In certain cases, as described herein, the additional distance sensor 350 and/or IMU 390 can be used to verify that user movement and/or position in order to enable orientation-based action.

In particular implementations, the controller 340 is configured to perform one or more orientation-based actions in controlling the audio device 10. In certain cases, as described herein, the controller 340 is configured to operate in distinct modes, such as an active mode and an idle mode. In particular cases, the controller 340 is configured to switch between an active mode and an idle mode based on whether orientation tracking is enabled at the audio device 10. For example, the controller 340 can be configured to switch between an active mode that includes orientation tracking, to an idle mode that does not include orientation tracking based on the operating state of the audio device 10 (e.g., a sleep mode or idle mode) and/or based on whether one or more applications running at the audio device 10 and/or the smart device 360 enables orientation tracking or orientation-based actions.

Figure 4:
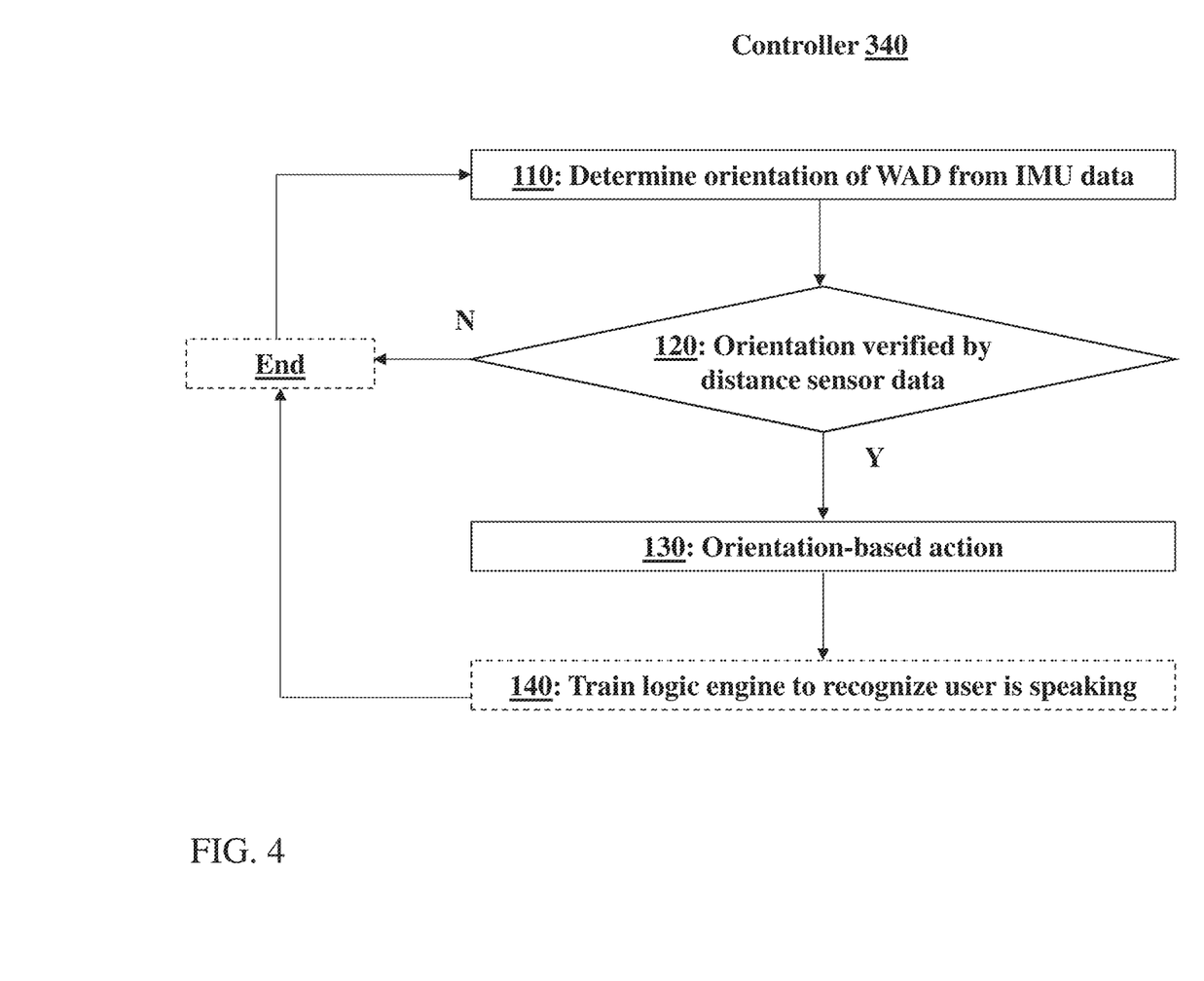
FIG. 4 is a flow diagram illustrating processes performed by a controller according to various implementations.

In certain cases, the controller 340 is configured to perform control processes based on detected orientation of the audio device 10. FIG. 4 is a flow diagram illustrating example processes performed by the controller 340 according to various implementations. In these cases, the controller 340 is configured to perform the following processes:

Process P110: Determine an orientation of a user of the wearable audio device (WAD) 10 based on an indication of motion from the IMU 330. In various implementations, the controller 340 receives data from the IMU 330 indicating movement at the audio device 10, e.g., user looks left/right/up/down, user walks or leans forward or backward, user accelerates and/or decelerates, etc. That is, the controller 340 receives motion data from the IMU 330 indicating that the user is in a first orientation. While the IMU 330 can be configured to detect user movement and/or orientation changes, it is known that IMUs can be subject to reliability issues. For example, as noted herein, IMUs such as IMU 330 can be subject to drift (or, bias drive) in indicated motion. This bias drift can create challenges in orientation-based control using strictly the IMU 330. Accordingly, the controller 340 is configured to perform additional processes outlined below.

Figure 5:
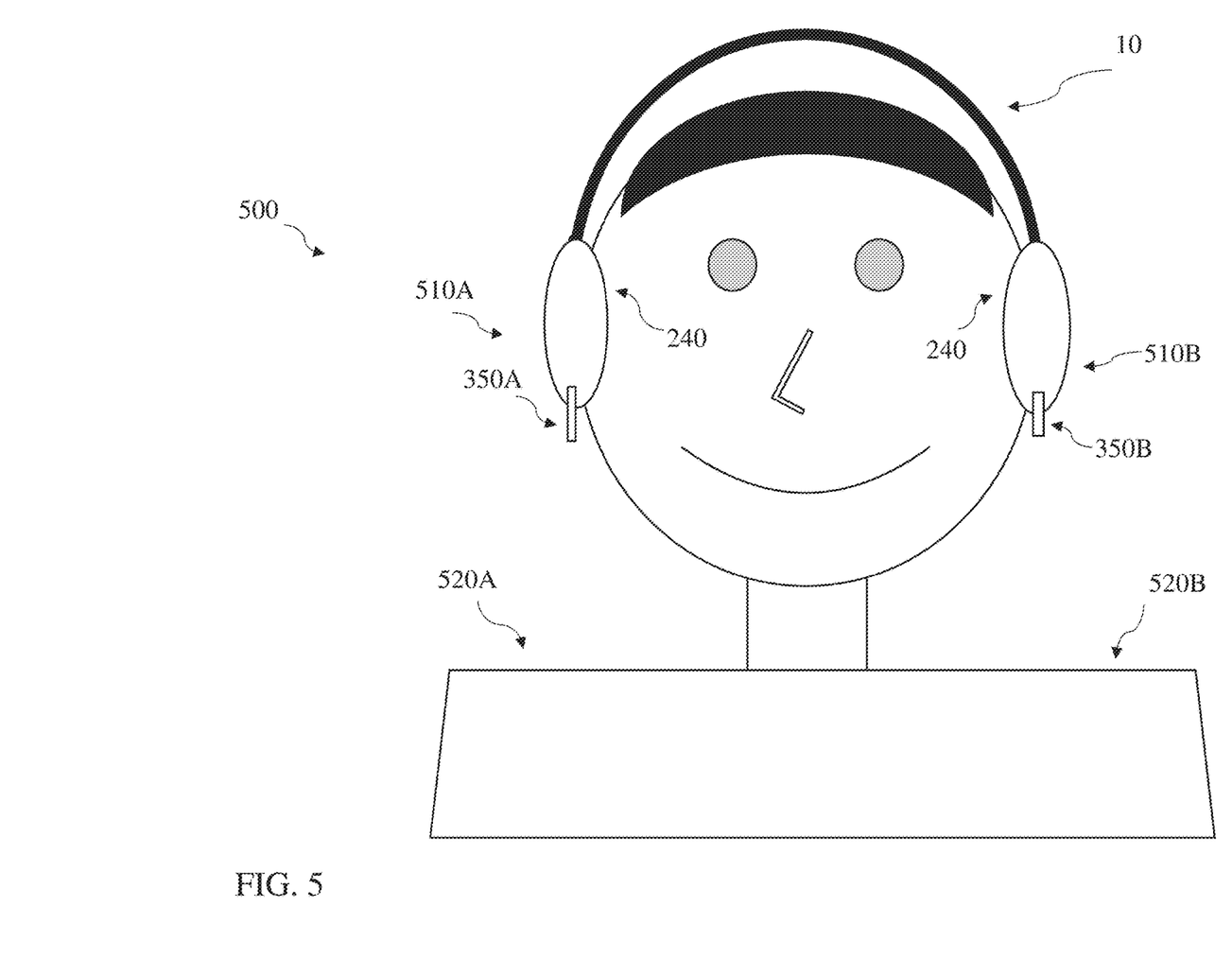
FIG. 5 is a schematic depiction of a user engaging an audio device according to various implementations.

Decision D120: verifying the orientation of the user as detected by the IMU 330, using data from the set of distance sensors 350. In various implementations, this process includes comparing received distance sensor data from distance sensor(s) 350 indicating a relative position of sections of the audio device 10 with the calculated position of the audio device 10 as determined from motion data obtained from the IMU 330. FIG. 5 depicts an example human user 500 wearing an audio device 10 according to various implementations. This example depicts two distinct distance sensors 350A, 350B located on different sections 510A, 510B of the audio device 10 (e.g., on distinct earcups 240). In some cases, the distance sensors 350 are configured to indicate a position relative to another body part of the user 500, e.g., a corresponding shoulder 520A, 520B. For example, distance sensor 350A can be configured to indicate a relative position of section 510A of the audio device 10 to the user's right shoulder 520A, while distance sensor 350B can be configured to indicate a relative position of section 510B of the audio device 10 to the user's left shoulder 520B. In certain cases, the distance sensors 350 include at least two sensors, e.g., 350A and 350B, for indicating a relative position of at least two sections of the audio device (e.g., sections 510A and 510B). In example implementations where the audio device 10 is approximately symmetrical, e.g., having a left and a right side, the distance sensors 350 can include at least one sensor on a right side of the audio device 10 and at least one sensor on a left side of the audio device 10. The distance sensors 350 can be positioned on the audio device 10 to indicate a relative position of a user's body or another surface. That is, when worn on the head of a user, the distance sensors 350 can be directed at least partially downward relative to the user's head to detect the relative position of each sensor 350 to a floor surface or a portion of the user's body (e.g., shoulders, chest, back, etc.). In certain implementations, when worn on the head of a user, the distance sensors 350 can be directed at least partially upward to detect the relative position of each sensor 350 to a ceiling, or can be directed at least partially sideways to the relative position of each sensor 350 to a wall. The distance sensors 350 can detect relative movement of the user's head with respect to one or more reference points (e.g., user's shoulders), and are configured to indicate side-to-side, up-down, tilting, swaying, and/or other movement of the user as would manifest in a change in position of the head relative to the reference point (e.g., shoulders).

In certain cases, as noted herein, detection of the relative position of the sensor(s) 350 to a reference point can be used with data from an orientation or movement detection system (e.g., an IMU) to correct for drift in that orientation or movement detection system (e.g., where a user is sitting or walking in a straight line). In additional implementations where the audio device 10 is body-worn and not specifically head-worn, the distance sensors 350 are positioned to detect relative movement of one or more portions of the user's body with respect to other portion(s) of the user's body and/or an external surface such as a ground surface.

As noted herein, the distance sensors 350 can include one or more of: an infra-red (IR) sensor, a vision sensor (e.g., camera such as a basic camera), an ultrasonic sensor a three-dimensional (3D) depth camera, a stereo camera system (e.g., including at least two cameras, where depth is extrapolated from multiple frame images at different orientations), a monocular system (e.g., single camera) with 3D reconstruction (e.g., where 3D transformations in terms of orientation, translation and/or depth are performed using a succession of frame images), or a time-of-flight system (e.g., where depth is measured directly). In certain cases, more than one distance sensor 350 is located on each side of the audio device frame, e.g., two or more sensors 350 are located on the left side and two or more sensors 350 are located on the right side of the frame. In a particular example, distinct types of sensors 350 are located on each side of the audio device frame, e.g., with two distinct types of sensors 350 located in section 510A and two distinct types of sensors 350 located in section 510B. In particular cases, the distance sensors 350 include a first subset of distance sensors 350 in section 510A and a second subset of distance sensors 350 in section 510B. In these examples, the subsets of sensors 350 can include a vision sensor paired with an IR sensor. In particular examples, the vision sensor includes a camera (e.g., a basic camera with approximately a 35-by-35 pixel capability in its Pixart sensor). In certain cases, the camera is configured to perform camera frame processing on its internal chip(s) (e.g., processing chip(s)). The paired vision sensor and IR sensor can be used in an optical flow processing approach according to various implementations. These particular cases may be beneficial for verifying user orientation (e.g., correcting for bias drift) by enabling the controller 340 to correlate depth data from the IR sensor with image (e.g., two-dimensional) data such as camera frames from the camera. That is, the controller 340 can use complementary data from the subsets of sensors 350 to verify the user orientation as initially indicated by the data from the IMU 330. In particular cases, the optical flow sensor processing includes generating processed video frames that provide a two-dimensional displacement in a plane that is parallel to the plane of the IR sensor. While in some cases, orientation can be verified with specialized video processing using raw video frames, various disclosed implementations improve on this process with optical flow processing, which can include using processed (e.g., compact) data from the camera and blending that data with additional sensors such as an IR sensor (e.g., using a blending procedure such as a Kalman filter). In one example, the raw output of the optical sensor (e.g., camera) is an (X,Y) shift in units of pixel counts (e.g., "the sensor position was shifted by 10 pixels"), that can be converted to physical units (e.g., meters) using the IR or any other distance sensor ("the sensor position was shifted by 38 cm"). Orientation verification can be useful in cases where a user is static (e.g., sitting in a chair, such as a pilot or a gaming chair), or moving in a relatively straight line (e.g., walking on a narrow path, or on a moving walkway).

In additional implementations, as illustrated optionally in FIG. 3, one or more distance sensors 350 are located at the smart device 360. In these examples, distance sensor(s) 350 at the smart device 360 are configured to communicate with the controller 340 to aid in verifying the user orientation as initially detected by the IMU 330. For example, the distance sensor(s) 350 at the smart device 360 can include a camera or another optical sensor, and can be configured to detect user movement (e.g., head or body movement) that is indicative of a change in orientation. In these implementations, the controller 340 can receive data from distance sensor(s) 350 at the smart device 360 as well as the distance sensors 350 on the audio device 10, and can compare distance indicators from all sensor(s) 350 to verify the orientation as initially detected by the IMU 330.

It is understood that in various implementations, the controller 340 is configured to verify that the user is in the first orientation (as detected by the IMU 330) within a confidence interval, e.g., within a predefined confidence interval. In these cases, the controller 340 is programmed to assign a confidence score to the data from distance sensors 350, and/or to a calculated difference in the orientation indicators from the IMU 330 and the distance sensors 350, such that only values from the distance sensor 350 with a threshold confidence score will be used in verifying user orientation. In various implementations, confidence scores can vary based on sources of data (e.g., sensor type) and/or location of the sensor (e.g., on audio device 10 versus smart device 360).

In various implementations, depending on whether the controller 340 can verify the orientation detected by the IMU 330 (Yes or No to Decision 120), the controller 340 takes one or more subsequent actions. For example, in response to failing (or refusing) to verify the orientation of the user with the data from the distance sensor(s) 350 (No to Decision 120), the controller 340 can continue receiving updated IMU data about movement of the audio device 10, or terminate (end) the process, which is illustrated in phantom in FIG. 4 as optional.

In cases where the controller 340 verifies the orientation as detected by the IMU 330 with the data from the distance sensors (Yes to Decision 120), the controller 340 is further configured, in process 130, to execute an orientation-based action. Examples of orientation-based actions can include initiating, terminating, and/or adjusting audio playback at the audio device 10, controlling voice (e.g., phone) call functions routed through the audio device 10, triggering one or more virtual personal assistant (VPA) functions such as voice command functions, activating or deactivating microphones for capturing and/or analyzing ambient acoustic signals, triggering gesture-based menu options for one or more applications running at the audio device 10, etc. Additional examples of orientation-based actions are described in U.S. patent application Ser. No. 16/570,238, U.S. patent application Ser. No. 16/511,375, U.S. patent application Ser. No. 16/179,205, and U.S. patent application Ser. No. 16/289,940, each of which is previously incorporated by reference in its entirety.

In specific examples, the wearable audio device 10 includes an aviation headset such as an in-ear or over-ear headset that can be coupled with an electronic flight bag (EFB) or equivalent, and in some cases includes a boom microphone. In these examples, the controller 340 can be configured to take one or more orientation-based actions that are particularly beneficial for aviation use, such as providing a warning to adjust a focus of the user. For example, the controller 340 can be configured to detect a user orientation (e.g., look direction) with approaches described herein, and in response to detecting that the user is looking in a direction that deviates from a desired direction of focus, provide a warning (e.g., audible, visual and/or vibrational warning) to adjust the focus direction of the user. These approaches can be beneficial in alerting a pilot to visible concerns within his/her field of view, or to one or more controls on an instrument panel that require attention.

Returning to FIG. 4, in an optional additional process performed after verifying the orientation of the user, the controller 340 is configured in process 140 to send data about the verified orientation to a position tracking system for lowering an error rate in at least one position tracking equation that calculates a position of the wearable audio device 10. In these cases, the controller 340 acts as a training mechanism for improving the position tracking equation, e.g., by providing an additional verified data point in calculating the position of the wearable audio device 10. In certain cases, the controller 340 sends the data about the verified orientation to the position tracking system on a periodic or continuous basis.

In various additional implementations, the verified orientation information can be used to enhance head tracking, e.g., to enhance the accuracy of head tracking computations that have various applications. For example, head tracking can be used in a variety of spatialized (or, three-dimensional) audio applications, such as in aviation (e.g., for alerts or notifications regarding flying hazards), gaming (e.g., to immerse the user in an environment), entertainment (e.g., to provide three-dimensional audio rendering with a variety of speaker systems). Improved orientation detection (e.g., through verification processes described herein) can benefit these applications, as well as others.

As noted herein, in various implementations the controller 340 is configured to switch between an active mode and an idle mode based on whether orientation tracking is enabled at the audio device 10. As also noted herein, orientation tracking can be enabled or disabled based on an operating state of the audio device 10 and/or activity by one or more software applications running on the audio device 10 or a connected smart device 360. For example, orientation tracking can be enabled by a navigation application or a virtual personal assistant (VPA) application running on the audio device 10 or a connected smart device 360 in order to enable accurate navigation instructions or gesture-based commands. While operating in the active mode, data from the set of distance sensors 350 can be obtained either on a periodic basis or in response to data from the IMU 330 indicating movement by the user. In some cases, while in active mode, the controller 340 is configured to perform processes 110 through 130 (and optionally, process 140) in response to receiving data from the IMU 330 that indicates movement by the user.

As described herein, controller 340 can have the technical effect of controlling orientation-based actions using the audio device 10. The various implementations described herein enable the user to experience orientation and/or gesture-based functions while avoiding false triggers. These implementations can allow the user to engage one or more command functions or application functions without viewing a visual interface, e.g., without needing to look at a device screen. These approaches allow the user to receive information, perform tasks and make commands with his/her hands free and head up. These approaches also avoid the nuisance of falsely triggering orientation-based actions when not intended. As such, the devices, systems and approaches described herein can significantly enhance the user experience when compared with conventional approaches.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A wearable audio device, comprising:
   an electro-acoustic transducer for providing an audio output;
   an inertial measurement unit (IMU) for indicating motion of the wearable audio device;
   a set of distance sensors; and
   a controller coupled with the electro-acoustic transducer, the IMU and the set of distance sensors, the controller configured to:
     determine an orientation of a user of the wearable audio device based on the indication of motion from the IMU;
     verify the orientation of the user as detected by the IMU, using data from the set of distance sensors, wherein verifying the orientation of the user corrects for drift in the indicated motion from the IMU and comprises:
       receiving motion data from the IMU indicating that the user is in a first orientation,
       receiving the data from the distance sensors, wherein the data from the distance sensors comprises two sets of distance data each indicating a relative position of a distinct section of the wearable audio device to a reference position, and
       verifying that the user is in the first orientation in response to the motion data from the IMU and the data from the distance sensors corresponding to the first orientation; and
     execute an orientation-based action in response to verifying the orientation of the user.

2. The wearable audio device of claim 1, wherein the set of distance sensors comprise at least two distinct sensors.

3. The wearable audio device of claim 1, wherein the set of distance sensors comprise a set of at least one of: an infra-red (IR) sensor, a vision sensor, an ultrasonic sensor a three-dimensional (3D) depth camera, a stereo camera system or a time-of-flight system.

4. The wearable audio device of claim 1, wherein the wearable audio device comprises a frame for mounting on a head of the user.

5. The wearable audio device of claim 4, wherein when worn on the head of the user, the set of distance sensors are directed at least partially downward relative to the head of the user to detect a relative position of each distance sensor to a a floor surface.

6. The wearable audio device of claim 1, wherein the set of distance sensors comprises a first subset of distance sensors on a left side of the frame and a second subset of distance sensors on a right side of the frame, wherein each subset comprises a vision sensor paired with an infra-red (IR) sensor.

7. The wearable audio device of claim 6, wherein the vision sensor comprises a camera, wherein the controller is configured to verify the orientation of the user by correlating depth data from the IR sensor with image data from the camera and wherein verifying the orientation of the user includes an optical flow processing approach to correct bias drift in the determined orientation of the user.

8. The wearable audio device of claim 1, wherein the wearable audio device comprises an aviation headset, and wherein the orientation-based action comprises providing a warning to adjust a focus of the user.

9. The wearable audio device of claim 1, wherein the wearable audio device comprises a head-mounted wearable audio device comprising one of: headphones, earphones, or audio eyeglasses.

10. The wearable audio device of claim 1, wherein the controller is configured to switch between an active mode and an idle mode based on whether orientation tracking is enabled at the wearable audio device.

11. The wearable audio device of claim 10, wherein during the active mode, data from the set of distance sensors is obtained either on a periodic basis or in response to data from the IMU indicating movement by the user.

12. The wearable audio device of claim 10, wherein orientation tracking is enabled or disabled by a software application running at the wearable audio device or a connected device.

13. The wearable audio device of claim 1, wherein the controller is configured to send data about the verified orientation to a position tracking system for lowering an error rate in at least one position tracking equation that calculates a position of the wearable audio device, wherein the position tracking system executes at the wearable audio device or a connected device.

14. The wearable audio device of claim 1, wherein the controller is further configured to:
   refuse to verify that the user is in the first orientation in response to the data from the distance sensors corresponding to a second, distinct orientation.

15. The wearable audio device of claim 1, wherein verifying the orientation of the user includes an optical flow processing approach to correct bias drift in the determined orientation of the user.

16. The wearable audio device of claim 15, wherein the bias drift occurs while the user is approximately static or moving in an approximately straight line.

17. The wearable audio device of claim 7, wherein the optical flow processing approach includes correlating depth data from each IR sensor with image data from the paired vision sensor to detect bias drift in the IMU.

18. A system, comprising:
   a wearable audio device, comprising:
     an electro-acoustic transducer for providing an audio output;
     an inertial measurement unit (IMU) for indicating motion of the wearable audio device; and
     a controller coupled with the electro-acoustic transducer and the IMU; and a set of distance sensors in communication with the controller, wherein the controller is configured to:
  determine an orientation of a user of the wearable audio device based on the indication of motion from the IMU;
  verify the orientation of the user as detected by the IMU, using data from the set of distance sensors, wherein verifying the orientation of the user corrects for drift in the indicated motion from the IMU and comprises:
    receiving motion data from the IMU indicating that the user is in a first orientation,
    receiving the data from the distance sensors, wherein the data from the distance sensors comprises two sets of distance data each indicating a relative position of a distinct section of the wearable audio device to a reference position, and
    either:
      a) verifying that the user is in the first orientation in response to the motion data from the IMU and the data from the distance sensors corresponding to the first orientation, or
      b) refusing to verify that the user is in the first orientation in response to the data from the distance sensors corresponding to a second, distinct orientation; and
  execute an orientation-based action at the wearable audio device in response to verifying the orientation of the user.

19. The system of claim 18, wherein the set of distance sensors are located on a wearable device that is distinct from the wearable audio device, and wherein the set of distance sensors comprises at least two distinct sensors.

20. A computer-implemented method of controlling a wearable audio device, the method comprising:
  verifying an orientation of a user of the wearable audio device as determined from motion detected by an inertial measurement unit (IMU) located at the wearable audio device, wherein the verifying comprises comparing data about the determined orientation of the user against data from a set of distance sensors, wherein verifying the orientation of the user corrects for drift in the indicated motion from the IMU and comprises:
    receiving motion data from the IMU indicating that the user is in a first orientation,
    receiving the data from the distance sensors, wherein the data from the distance sensors comprises two sets of distance data each indicating a relative position of a distinct section of the wearable audio device to a reference position, and
    either: a) verifying that the user is in the first orientation in response to the motion data from the IMU and the data from the distance sensors corresponding to the first orientation, or b) refusing to verify that the user is in the first orientation in response to the data from the distance sensors corresponding to a second, distinct orientation; and
  executing an orientation-based action at the wearable audio device in response to verifying the orientation of the user.

\* \* \* \* \*